United States Patent
Yang

(10) Patent No.: US 12,114,243 B2
(45) Date of Patent: Oct. 8, 2024

(54) METHOD AND SYSTEM FOR NETWORKING

(71) Applicant: BEIJING XIAOMI MOBILE SOFTWARE CO., LTD., Beijing (CN)

(72) Inventor: Tao Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 213 days.

(21) Appl. No.: 17/852,095

(22) Filed: Jun. 28, 2022

(65) Prior Publication Data

US 2023/0262435 A1 Aug. 17, 2023

(30) Foreign Application Priority Data

Feb. 15, 2022 (CN) .......................... 202210138261.4

(51) Int. Cl.
  *H04W 4/80* (2018.01)
  *H04B 5/77* (2024.01)
  *H04W 12/041* (2021.01)
  *H04W 40/02* (2009.01)

(52) U.S. Cl.
  CPC .............. *H04W 4/80* (2018.02); *H04B 5/77* (2024.01); *H04W 12/041* (2021.01); *H04W 40/02* (2013.01)

(58) Field of Classification Search
  CPC ..... H04W 4/80; H04W 12/041; H04W 40/02; H04B 5/77
  USPC ...................................................... 455/41.1
  See application file for complete search history.

(56) References Cited

U.S. PATENT DOCUMENTS

| | | | |
|---|---|---|---|
| 9,549,282 B1* | 1/2017 | McDonough | H04W 4/021 |
| 2013/0036231 A1* | 2/2013 | Suumaki | H04W 12/04 |
| | | | 709/228 |
| 2015/0223063 A1* | 8/2015 | Hong | H04W 4/80 |
| | | | 726/9 |
| 2016/0087933 A1* | 3/2016 | Johnson | H04L 41/08 |
| | | | 709/245 |
| 2017/0272316 A1* | 9/2017 | Johnson | H04L 61/301 |
| 2019/0158353 A1* | 5/2019 | Johnson | G06F 16/95 |
| 2020/0059430 A1* | 2/2020 | Trautmann | H04L 43/16 |
| 2020/0379744 A1* | 12/2020 | Bhupati | H04L 67/61 |
| 2021/0073661 A1* | 3/2021 | Matlick | H04L 61/3025 |

OTHER PUBLICATIONS

European Patent Application No. 22181915.4, Search and Opinion dated Dec. 14, 2022, 8 pages.

* cited by examiner

*Primary Examiner* — April G Gonzales
(74) *Attorney, Agent, or Firm* — Cozen O'Connor

(57) ABSTRACT

A method for networking, including: in response to the terminal entering an effective communication range of a first NFC sensing device in a first router, interacting with the first NFC sensing device, so that the first router or the terminal obtains key information, in which the key information is configured for networking the first router and a second router; and in response to the terminal entering an effective communication range of a second NFC sensing device in the second router, writing the key information into the second NFC sensing device.

17 Claims, 7 Drawing Sheets

METHOD AND SYSTEM FOR NETWORKING

CROSS REFERENCE TO RELATED APPLICATIONS

This application claims priority to Chinese Patent Application No. 202210138261.4, filed on Feb. 15, 2022, the entire content of which is incorporated herein by reference.

TECHNICAL FIELD

The disclosure relates to a field of wireless communication technologies, and particularly to a method, an apparatus and a system for networking, an electronic device and a storage medium.

BACKGROUND

With widespread application of networking technology, networking has gradually become a standard function of intelligent routing.

In the related art, the networking may be constructed between routers by means of wired connection or hotspot (e.g., Wi-Fi) connection. However, in the related art, the method for networking the routers by means of wired or hotspots has problems such as complicated deployment and low security, which cannot meet user requirements.

SUMMARY

According to a first aspect of the disclosure, a method for networking is provided. The method is performed by a terminal. The method includes: in response to the terminal entering an effective communication range of a first Near Field Communication (NFC) sensing device in a first router, interacting with the first NFC sensing device, so that the first router or the terminal obtains key information, in which the key information is configured for networking the first router and a second router; and in response to the terminal entering an effective communication range of a second NFC sensing device in the second router, writing the key information into the second NFC sensing device.

According to a second aspect of the disclosure, a method for networking is provided. The method is performed by a router. The method includes: performing communication detecting by a NFC sensing device in the router; and in response to detecting that a terminal enters an effective communication range of the NFC sensing device, interacting with the terminal via the NFC sensing device, so that the router or the terminal obtains key information, in which the key information is configured for networking the router and another router.

According to a third aspect of the disclosure, a system for networking is provided. The system includes: a terminal, a first router and a second router. The first router may have a first NFC sensing device. The first NFC sensing device is configured to sense whether a terminal enters a first effective communication range of the first NFC sensing device. The second router may have a second NFC sensing device. The second NFC sensing device is configured to sense whether the terminal enters a second effective communication range of the second NFC sensing device. The terminal may be configured to in response to entering the first effective communication range, interact with the first NFC sensing device, so that the first router or the terminal obtains key information; and in response to entering the second effective communication range, writing the key information into the second NFC sensing device. The first router and the second router are networked by using the key information.

It should be understood that, the foregoing general description and the following detailed description are exemplary and explanatory, which do not limit the disclosure.

BRIEF DESCRIPTION OF THE DRAWINGS

The drawings herein are incorporated into the specification and constitute a part of the specification, show embodiments in conformity with embodiments of the disclosure, and explain the principle of the disclosure together with the specification.

DETAILED DESCRIPTION

Figure 1:
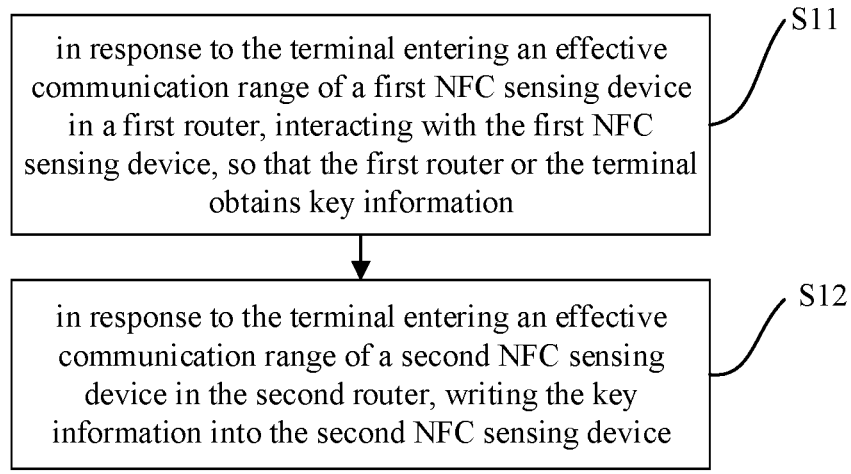
FIG. 1 is a flowchart of a method for networking according to an embodiment.

The embodiments may be described in detail here, examples of which are shown in the accompanying drawings. When the following descriptions refer to the accompanying drawings, unless otherwise indicated, the same numbers in different drawings represent the same or similar elements. The implementations described in the following example embodiments do not represent all the implementations consistent with the disclosure.

Throughout the drawings, the same or similar reference numbers refer to the same or similar elements or elements having the same or similar functions. The described embodiments are some, but not all, of the embodiments of the disclosure. The embodiments described below with reference to the accompanying drawings are exemplary, and are intended to explain the disclosure and should not be construed as a limitation of the disclosure. Based on the embodiments in the disclosure, all other embodiments obtained by those of ordinary skill in the art without creative efforts shall fall within the protection scope of the disclosure. The embodiments of the disclosure may be described in detail below with reference to the accompanying drawings.

The method for networking according to the embodiments of the disclosure may be applied to a scenario for performing networking connection through a router.

With the widespread application of networking technology, networking has gradually become a standard function of intelligent routing. In the related art, the networking among routers may be performed by wired or hotspot (Wi-Fi) connection, leading to problems such as complicated deployment and low security and being unable to meet user requirements. For example, in the method for constructing the networking by means of wired connection, the insertion and disassembly of data cables among multiple routers are needed since the distances among multiple routers are often far apart. As such, there are problems of complicated operation and difficult deployment. For another example, in the method for constructing the networking by means of hotspot connection, multiple routers need to be preset with the same key information, and the preset key information is used to exchange networking information in the process of hotspot connection, so as to realize a networking connection. There are two possible solutions for the scenario where the same key information is preset and router networking is performed through the hotspot connection. In the first possible solution, the same key information is directly preset for routers of the same model or batch. When the first possible solution is applied for adjacent networking where a coverage area includes overlapping areas, there is a problem of the networking concatenation due to the same key information and security risks exist. In the second possible solution, the same key information is directly preset for multiple routers used to construct the same networking, but there is a problem that new routers cannot be added to expand the coverage area of networking. To sum up, in the related art, the usage requirements cannot be satisfied by the method of constructing a networking through a router.

In addition, as the Near Field Communication (NFC) application scenarios become more and more abundant, products such as routers also begin to deploy with a NFC function. The NFC function of routers also provides more possibilities for networking among routers.

In view of this background, the disclosure provides a method for networking, which is applied to a terminal. For a router configured with an NFC sensing device, the key information needed for router networking may be transmitted by establishing NFC interaction between the terminal and the router. Since a user may independently select a router to interact with the terminal, it is possible to establish a networking between the routers designated by the user. Since the key information needed for router networking may be transmitted between routers through the terminal, the key information may be set to be non-universal, which may improve the concatenation of adjacent networking caused by the preset universal key information. Moreover, since the key information is transmitted between the terminal and the newly added router through the NFC function, the newly added router may be added to the network. In this way, the actual usage requirements for expanding the coverage area of the networking may be satisfied. In the method for networking according to the embodiments of the disclosure, the key information is transmitted through the NFC function between the terminal and the router, and after the key information is transmitted, networking between the routers may be established through a hotspot. Therefore, the networking establishment process does not need to insert and disassemble data cables. The method for networking according to the embodiments of the disclosure has simple operations and is convenient for deployment, and may meet the actual needs of establishing a networking through a router.

Figure 11:
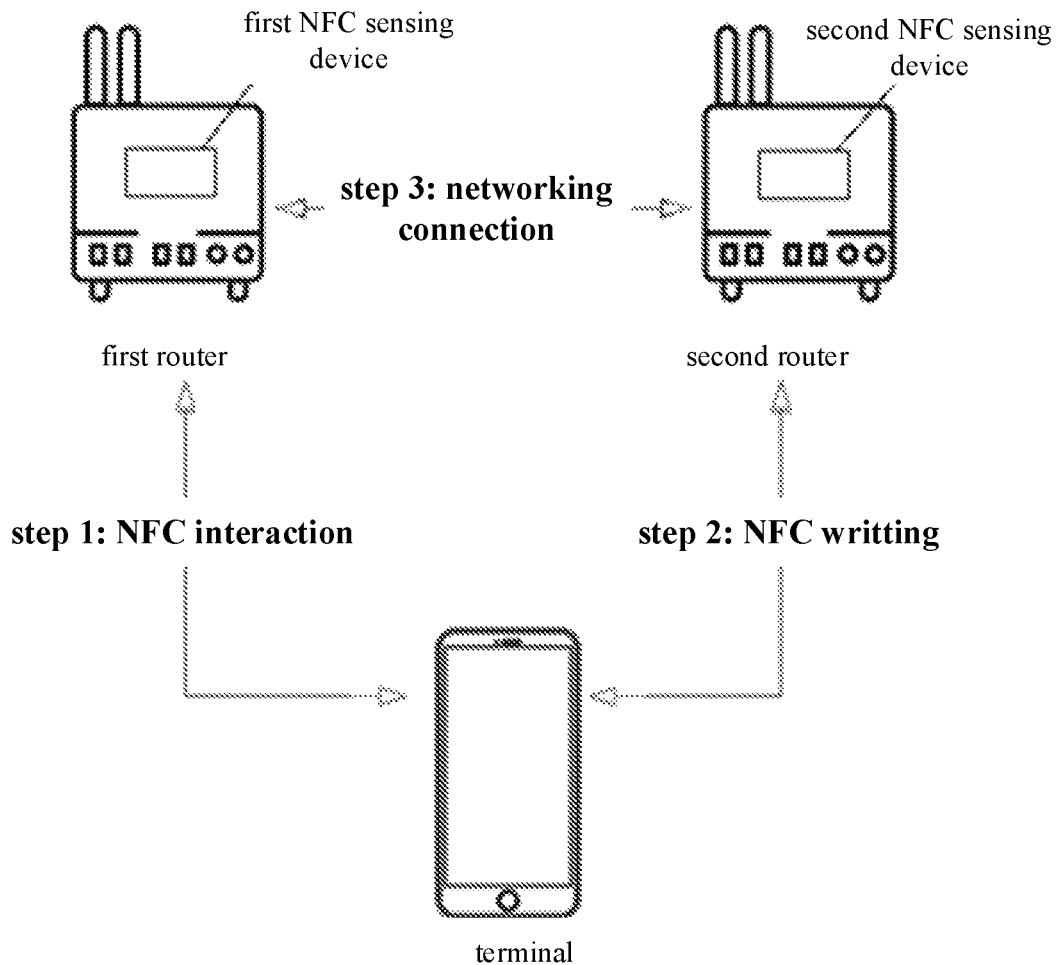
FIG. 11 is a schematic diagram of interactions among a terminal, a first router, and a second router according to an embodiment.

In the disclosure, for the convenience of description below, the router, that interacts with the terminal so that the terminal and the router itself obtain the key information, is called a first router, the router whose key information is written by the terminal is called a second router. An NFC sensing device of the first router is called a first NFC sensing device, and an NFC sensing device of the second router is called a second NFC sensing device. In the disclosure, the NFC sensing device may be set on the router and may include an NFC tag as shown in FIG. 11, in which the NFC tag may be used to sense whether the terminal is located within an effective communication range of the NFC sensing device. The NFC tag has a function of being read and written.

FIG. 1 is a flowchart of a method for networking according to an embodiment. As shown in FIG. 1, the method for networking is performed by a terminal, and includes the following steps.

At S11, in response to the terminal approaching the first NFC sensing device of the first router and entering an effective communication range of the first NFC sensing device, the terminal interacts with the first NFC sensing device, so that the first router or the terminal may obtain key information.

In the embodiment of the disclosure, the terminal interacts with the first NFC sensing device so that the first router or the terminal obtains the key information, which may be understood as that the terminal transmits the key information to the first router (or the first router transmits the key information to the terminal). The transmission of the key information is realized through the interaction between the terminal and the first NFC sensing device.

At S12, in response to the terminal approaching the second NFC sensing device of the second router and entering an effective communication range of the second NFC sensing device, the key information is written into the second NFC sensing device.

In the method for networking according to the embodiments of the disclosure, the terminal may write the key information obtained by the first router into the second router, so that the first router and the second router may obtain the key information that may be sharable. Further, the first router and the second router may exchange information and establish networking by using the key information.

In the embodiment of the disclosure, since the first or second NFC sensing device is usually a low-level NFC sensing device and has a function of being only-read or only-written, transmitting the key information by the terminal may save the deployment cost of the NFC sensing device. In addition, the distances between multiple routers used to construct the same networking are usually far apart, and NFC interaction cannot be performed directly. Therefore, the method of transmitting the key information by the terminal is more suitable for actual usage requirements. In an actual scenario of deploying routers, when the first router and the second router may meet the conditions for direct NFC interaction, transmitting the key information may also be achieved directly through the interaction between the first NFC sensing device and the second NFC sensing device. For example, the first router writes the key information into the first NFC sensing device, and when the first NFC sensing device and the second NFC sensing device are located within the effective communication range of each other, the first NFC sensing device writes the key information into the second NFC sensing device, so that the second router obtains the key information.

In an embodiment, the key information may be generated by the terminal. In addition, the terminal may write the key information into the first router via the first NFC sensing device, so that the first router may obtain the key information.

Figure 2:
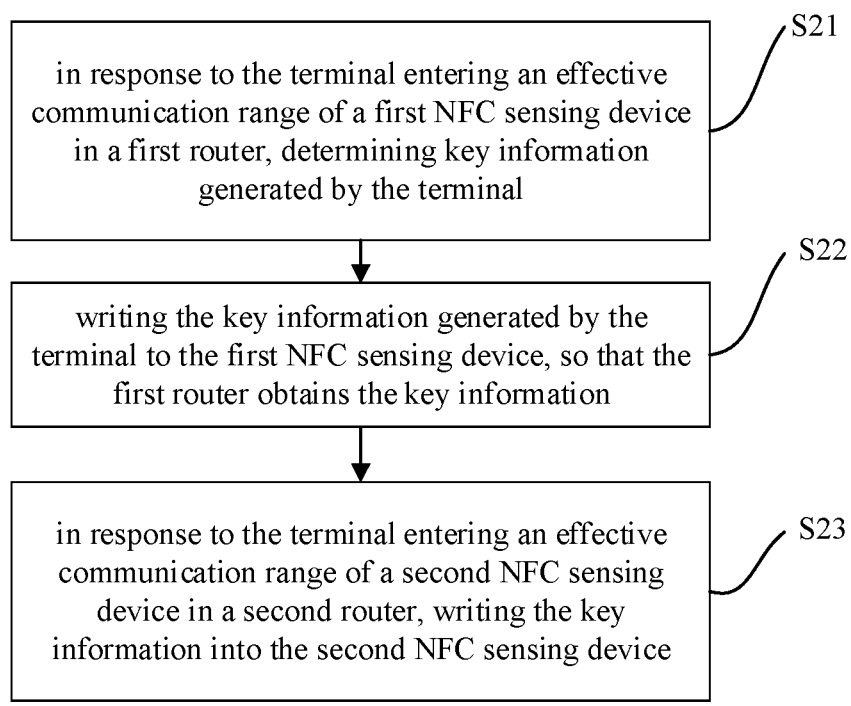
FIG. 2 is a flowchart of another method for networking according to an embodiment.

FIG. 2 is a flow chart of another method for networking according to an embodiment. As shown in FIG. 2, the implementation at S23 in the embodiment of the disclosure is similar to the implementation at S12 of FIG. 1, which is not repeated here.

At S21, in response to the terminal approaching the first NFC sensing device of the first router and entering the effective communication range of the first NFC sensing device, the key information generated by the terminal is determined.

The key information generated by the terminal may be obtained by a specified value input by the user, or may be generated based on a random value obtained by the terminal through a random algorithm.

In an example, when the key information is generated by using the specified numerical value input by the user, the user may input different numerical values, so that the terminal generates different key information matching different numerical values. Based on the different key information matching different numerical values input by the user, different networking maybe established. For example, the user may control the terminal to perform transmission of the key information with router B1, router B2 and router B3 through the key information matching numerical value A1, and the user may control the terminal to perform transmission of the key information with router B4, router B5 and router B6 through the key information matching numerical value A2. In this case, router B1, router B2, and router B3 may construct networking C1; and router B4, router B5 and router B6 may construct networking C2. In addition, since the key information used by the networking C1 and the networking C2 is different, there is no problem of concatenation between the networking C1 and the networking C2 caused by the universal key information.

At S22, the key information generated by the terminal is written into the first NFC sensing device, so that the first router may obtain the key information.

In the embodiment of the disclosure, when the key information is generated by the terminal, the setting of key information is more flexible, and personalized settings may be performed for different usage scenarios. Moreover, it may be understood that, since the multiple routers that construct the networking are connected through the key information generated by the terminal, the key information among the multiple routers may be the same information. Thus, for a plurality of routers for constructing a networking, a connection may be realized between any two routers, which improves the connectivity between the routers within the networking.

In another embodiment, the key information may be generated by the first router, and the terminal may obtain the key information by reading the key information written into the first NFC sensing device.

Figure 3:
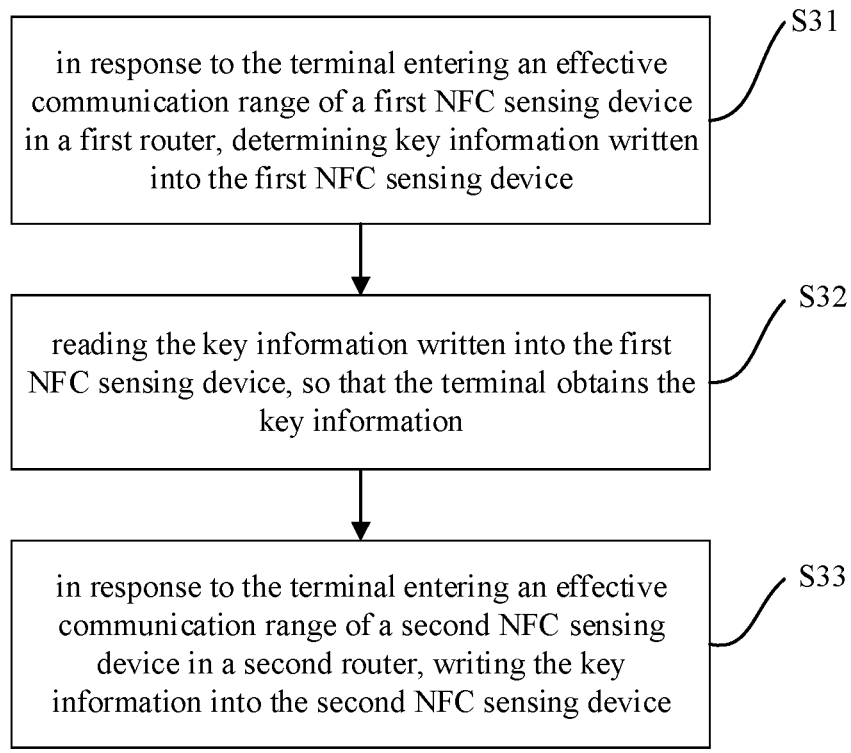
FIG. 3 is a flowchart of yet another method for networking according to an embodiment.

FIG. 3 is a flowchart of another method for networking according to an embodiment. As shown in FIG. 3, the implementation at S33 in the embodiment of the disclosure is similar to the implementation at S12 of FIG. 1, which is not repeated here.

At S31, in response to the terminal approaching the first NFC sensing device of the first router and entering the effective communication range of the first NFC sensing device, the key information written into the first NFC sensing device is determined.

The key information written into the first NFC sensing device may be generated and written by the first router.

In an example, the key information written into the first NFC sensing device may be generated based on a value obtained by the first router through a random algorithm, and may also be preset before the first router leaves the factory. In the embodiment of the disclosure, since the second router obtains the key information of the first router via the terminal, the second router does not need to have preset the same key information as the first router before leaving the factory. In addition, in order to reduce the possibility of establishing the networking between the first router and a router that still obtains the key information without the interaction to the terminal (that is, its preset key information is the same as that of the first router), different key information may be preset by different routers before leaving the factory.

At S32, the key information written into the first NFC sensing device is read, so that the terminal obtains the key information.

In the method for networking according to the embodiments of the disclosure, the first router generates key information, and the terminal transmits the key information generated by the first router to the second router, so that the first router and the second router may obtain the key information for establishing the interaction at the same time. In this way, the first router and the second router may establish the networking through the key information.

Based on the same concept, an embodiment of the disclosure also provides a method for networking applied to a router. It may be understood that the method for networking applied to a router according to the embodiment of the disclosure may be applied to the first router or the second router involved in the above embodiments.

Figure 4:
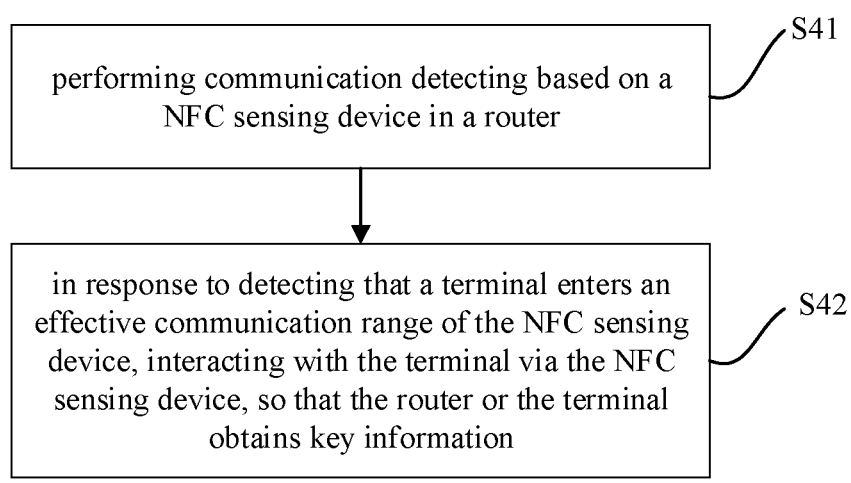
FIG. 4 is a flowchart of a method for networking according to an embodiment.

FIG. 4 is a flow chart of a method for networking according to an embodiment. As shown in FIG. 4, the method for networking is applied to a router and includes the following steps.

At S41, communication detecting is performed by an NFC sensing device of the router.

At S42, in response to detecting that the terminal approaches the NFC sensing device and enters the effective communication range of the NFC sensing device, the router interacts with the terminal via the NFC sensing device, so that the router or the terminal obtains key information.

In the method for networking according to the embodiments of the disclosure, the router may interact with the terminal via the configured NFC sensing device, so that the router or the terminal may obtain the key information. In this way, the router that obtains the key information may encrypt networking information by using the key information and broadcast the encrypted networking information, or may decrypt the encrypted networking information after receiving the encrypted networking information sent by other routers and send a networking request. In the above process, the router sends the networking information or sends the networking request to perform networking connection.

In certain embodiment of the disclosure, the key information may be generated by the router. The key information generated by the router may be transmitted to the terminal via the interaction between the router and the terminal, so that the router and the terminal obtain the key information.

Alternatively, the key information may also be generated by the terminal. The key information generated by the terminal may be transmitted to the router via the interaction between the router and the terminal, so that the router and the terminal may obtain the key information. The specific implementation of generating the key information by the terminal or by the router has been described in the above embodiments, and reference may be made to any of the above embodiments for related content.

In an embodiment, the router may generate key information, and write the generated key information into the NFC sensing device, so that the terminal may obtain the key information by reading the key information written into the NFC sensing device.

Figure 5:
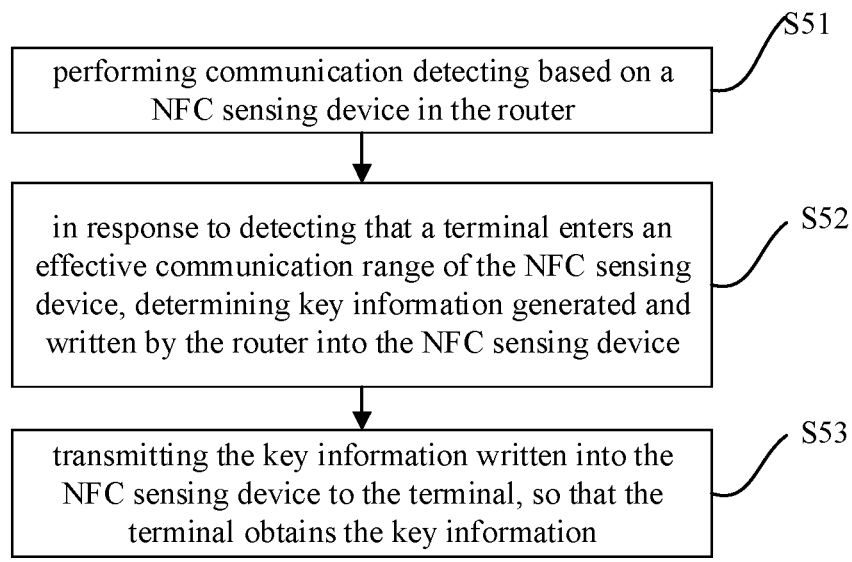
FIG. 5 is a flowchart of another method for networking according to an embodiment.

FIG. 5 is a flow chart of another method for networking according to an embodiment. As shown in FIG. 5, the implementation at S51 in the embodiment of the disclosure is similar to that at S41 in FIG. 4, which is not repeated here.

At S52, in response to detecting that the terminal approaches the NFC sensing device and enters the effective communication range of the NFC sensing device, it is determined that the router generates and writes key information into the NFC sensing device.

At S53, the key information written into the NFC sensing device is transmitted to a terminal, so that the terminal obtains the key information.

With the method according to the embodiment of the disclosure, the router may generate the key information, and when the terminal approaches the NFC sensing device and enters the effective communication range of the NFC sensing device, the key information may be transmitted to the terminal, so that the terminal may obtain the key information.

In another embodiment, the router may receive the key information written by the terminal via the NFC sensing device.

Figure 6:
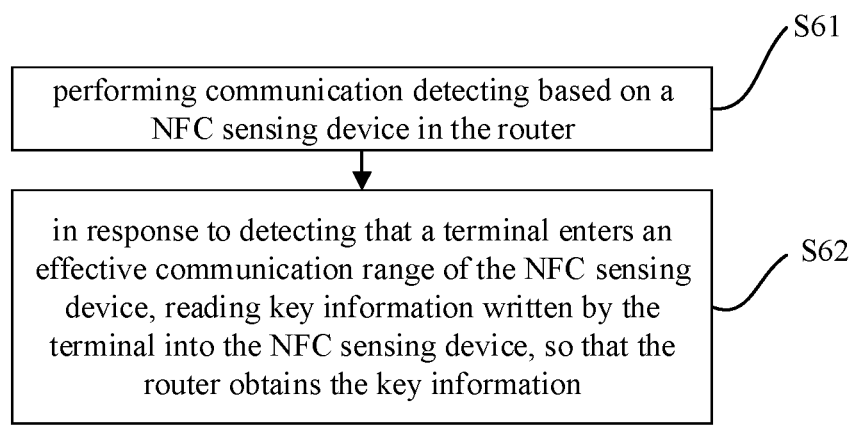
FIG. 6 is a flowchart of yet another method for networking according to an embodiment.

FIG. 6 is a flowchart of another method for networking according to an embodiment. As shown in FIG. 6, the implementation at S61 in the embodiment of the disclosure is similar to the implementation at S41 in FIG. 4, which is not repeated here.

At S62, in response to detecting that the terminal approaches the NFC sensing device and enters the effective communication range of the NFC sensing device, key information written by the terminal into the NFC sensing device is read, so that the router obtains the key information.

With the method according to the embodiment of the disclosure, when the terminal approaches the NFC sensing device and enters the effective communication range of the NFC sensing device, the key information written by the terminal may be received via the NFC sensing device, so that the router may obtain the key information.

In an example, when the key information is generated by the router, or the key information is written by the terminal, the router may be controlled to encrypt networking information with the key information, and broadcast the encrypted networking information.

Figure 7:
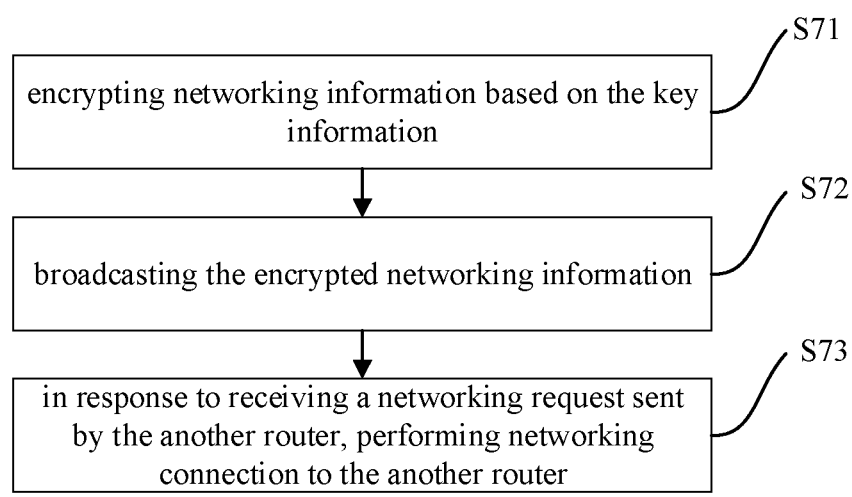
FIG. 7 is a flowchart of a method for broadcasting networking information through a router according to an embodiment.

FIG. 7 is a flowchart of a method for broadcasting networking information through a router according to an embodiment. As shown in FIG. 7, the method includes the following steps.

At S71, encryption processing on networking information is performed based on the key information.

In the embodiment of the disclosure, the networking information is used to instruct other routers to perform targeted propagation of a networking request to the router that sends the networking information.

At S72, the encrypted networking information is broadcast.

In the embodiment of the disclosure, the networking information may be broadcast by means of Bluetooth broadcast. For example, the networking information may be set in a management frame (i.e., mgmt), and the encrypted networking information may be broadcast by broadcasting the management frame.

At S73, in response to receiving a networking request sent by the other router, networking connection with the other router is performed.

In certain embodiment of the disclosure, the router may encrypt and broadcast the networking information through the key information. Further, when receiving the networking request sent by other routers, the router may perform networking connection with other routers based on the networking request. The networking request may be triggered by other routers after the networking information is successfully decrypted based on the key information.

In an example, other routers may obtain a mesh address corresponding to the router that sends the networking information after the networking information is decrypted. Further, other routers may send a networking request encrypted with the key information to the mesh address after decryption. In this way, the router that sends the networking information may receive the networking request, and perform authentication of the key information by decrypting the networking request with the key information, thus determining that the other routers are the routers that need to perform networking connection. In this case, the router that sends the networking information may establish a secure connection with other routers, and then perform a subsequent networking connection.

In certain embodiment of the disclosure, the router that broadcasts the encrypted networking information may be understood as the first router involved in the above embodiments. In other words, the first router may also be understood as a router that performs networking connection by broadcasting networking information and receiving a networking request.

In an example, when the networking information encrypted by the key information and sent by other routers is received, the router that receives the key information written by the terminal may decrypt the networking information and send a networking request in response to successful decryption.

Figure 8:
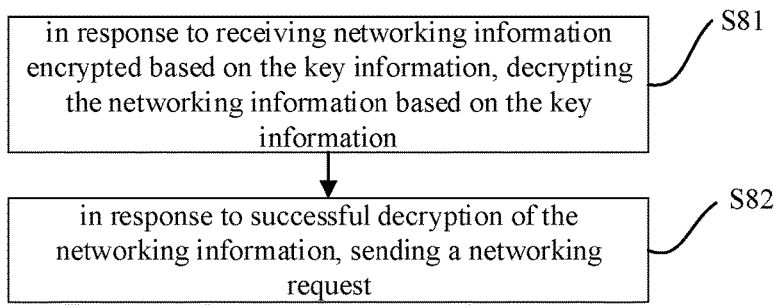
FIG. 8 is a flowchart of a method for sending a networking request through a router according to an embodiment.

FIG. 8 is a flowchart of a method for sending a networking request through a router according to an embodiment. As shown in FIG. 8, the method includes the following steps.

At S81, in response to receiving the networking information encrypted with the key information, the networking information is decrypted based on the key information.

At S82, in response to successful decryption of the networking information, a networking request is sent.

The key information used for successfully decrypting the networking information is obtained by the terminal through interaction with other routers.

In the method for networking according to the embodiments of the disclosure, when the networking information encrypted with the key information is received, the router may decrypt the networking information by using the key information written by the terminal. In this way, when the networking information is successfully decrypted, the networking request may be sent, so as to perform networking connection with the router that sends the networking information.

In certain embodiment of the disclosure, the router that decrypts the networking information and sends the networking request may be understood as the second router involved in the above embodiment. In other words, the second router may also be understood as a router that performs networking connection by receiving and decrypting the networking information and sending a networking request.

Figure 9:
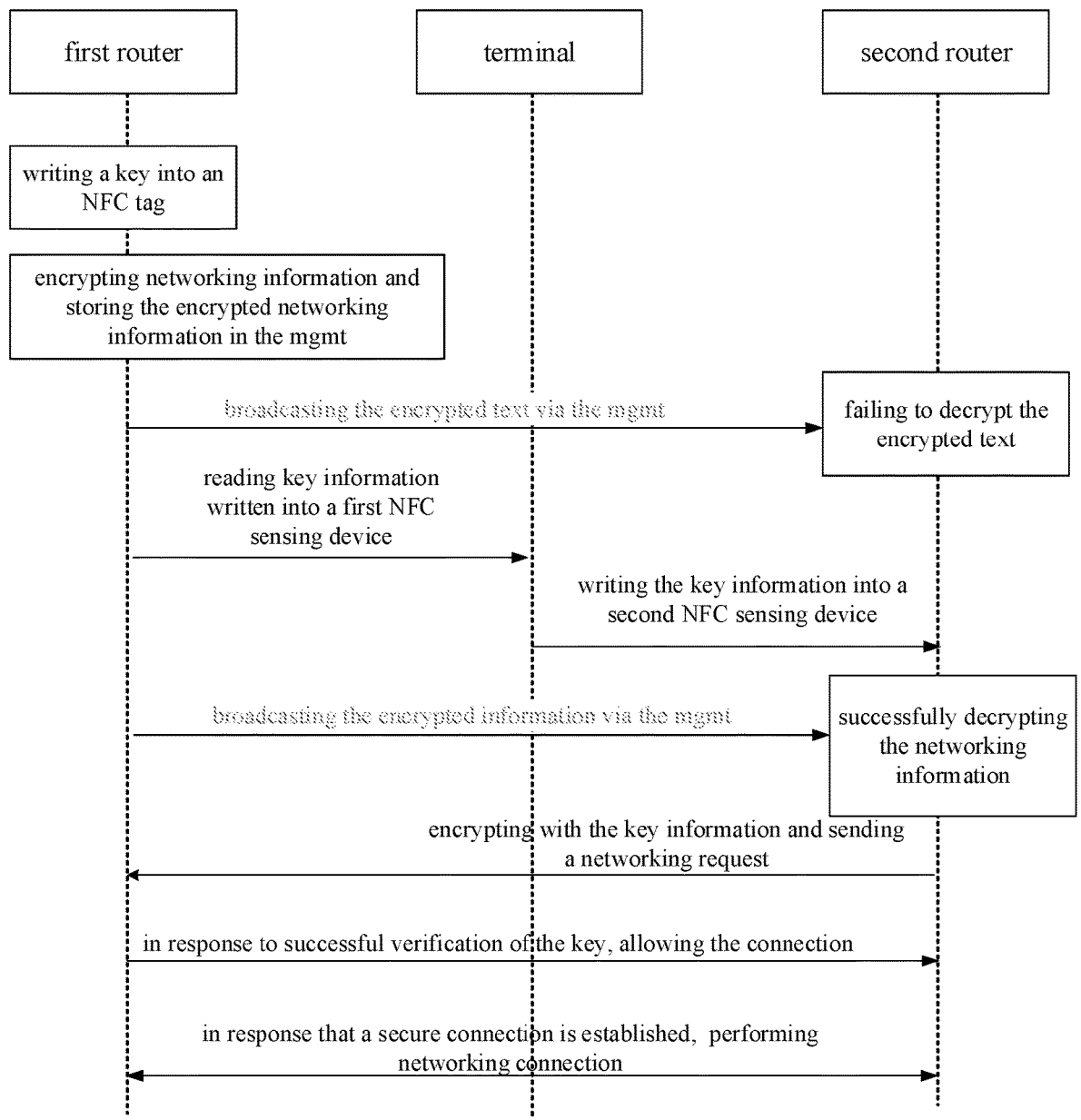
FIG. 9 is a schematic flowchart of networking with key information generated by a router according to an embodiment.

FIG. 9 is a schematic flowchart of networking with key information generated by a router according to an embodiment. In an example, as shown in FIG. 9, the first router may generate key information, and write the key information into a first NFC sensing device. In addition, the first router may generate and encrypt networking information, store the encrypted networking information in the management frame "mgmt", and broadcast the encrypted networking information by broadcasting the mgmt. In this way, the second router may receive the encrypted networking information, and may decrypt the received networking information after obtaining the key information.

In an example, the terminal may be used as a transmission medium of the key information, and transmit the key information generated by the first router to the second router, so that the second router may decrypt the encrypted networking information generated by the first router with the key information. For example, the terminal may approach the first NFC sensing device to read the key information written into the NFC sensing device. Further, the terminal may approach the second NFC sensing device to write the previously-read key information into an NFC sensing device of the second router. In this way, the second router may obtain the key information by reading the key information written into the second NFC sensing device, and further decrypt the received networking information with the key information.

For example, when the networking information is successfully decrypted, the second router may send a networking request to the first router by using the key information. Further, the first router may verify the key information of the networking request when the networking request is received, and the second router is allowed to connect to the first router (i.e., a secure connection is established) in response that the key information is successfully verified. In this way, the first router and the second router may perform networking connection through the established secure connection, thus obtaining a networking consisting of the first router and the second router.

Figure 10:
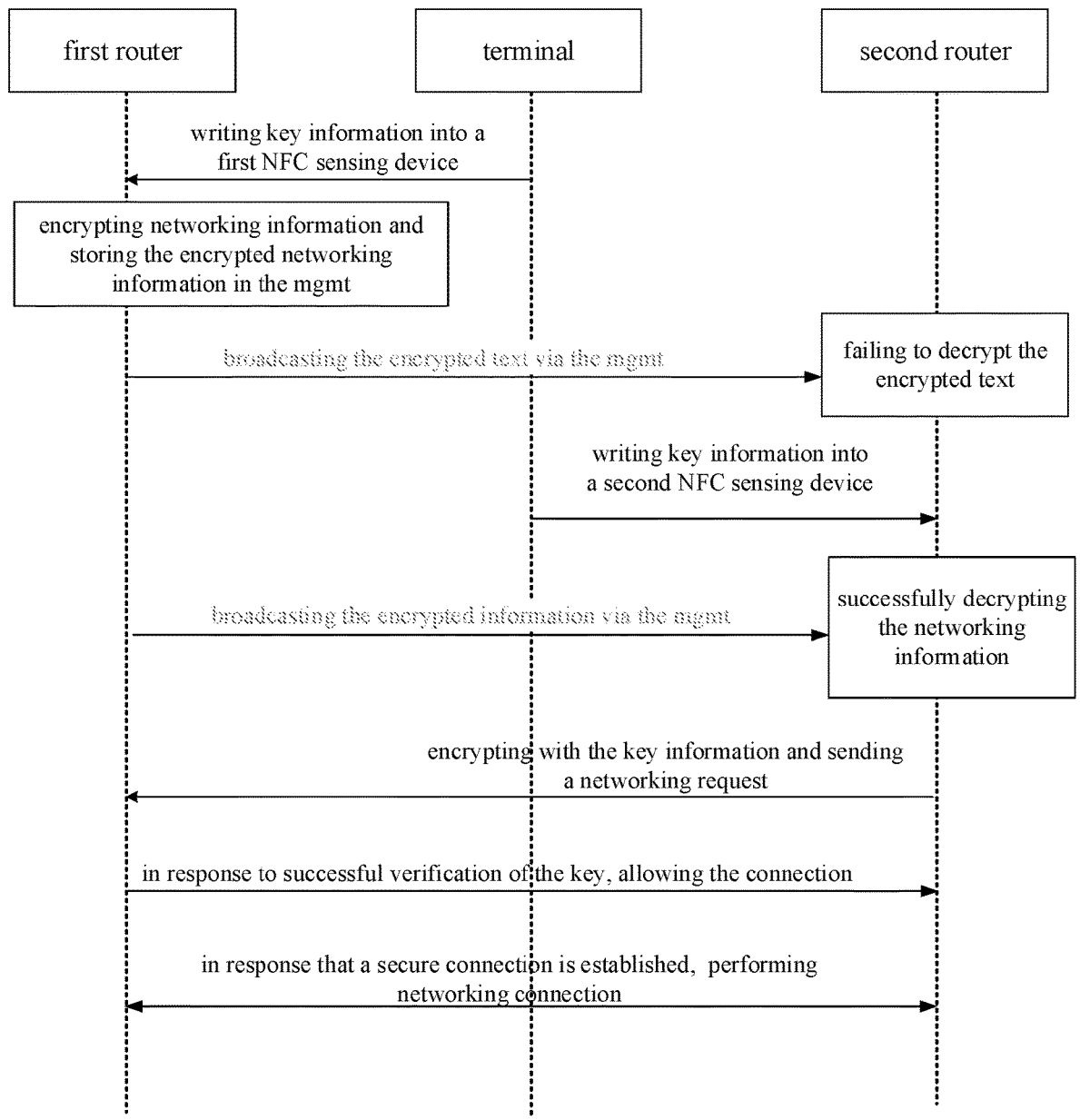
FIG. 10 is a schematic flowchart of performing networking connection with key information generated by a terminal according to an embodiment.

FIG. 10 is a schematic flowchart of performing networking connection with key information generated by a terminal according to an embodiment. In an example, as shown in FIG. 10, the terminal may generate and transmit key information to the first router and the second router respectively. For example, the terminal may approach the first NFC sensing device to write the generated key information into the first NFC sensing device of the first router. Also, the terminal may approach the second NFC sensing device to write the generated key information into the second NFC sensing device of the second router.

Based on this, the first router may read the key information included in the first NFC sensing device, and encrypt networking information with the key information, so as to broadcast the encrypted networking information. For example, the first router may store the encrypted networking information in the mgmt, and broadcast the encrypted networking information by broadcasting the mgmt.

In an example, when the terminal writes the key information into the second NFC sensing device, the second router may read the key information in the second NFC sensing device and decrypt the encrypted networking information through the key information when the encrypted networking information is received. When the second router successfully decrypts the networking information, a networking request may be sent to the first router according to the decrypted networking information. Further, when the networking request is received, the first router may verify the key information of the networking request, and when the key information is successfully verified, the second router is allowed to connect to the first router (i.e., a secure connection is established). In this way, the first router and the second router may perform networking connection through the established secure connection, thus obtaining a networking consisting of the first router and the second router.

Based on the same concept, an embodiment of the disclosure also provides a system for networking which includes a terminal, a first router, and a second router. The terminal is configured to in response to approaching a first NFC sensing device of the first router and entering an effective communication range of the first NFC sensing device, read key information included in the first NFC sensing device of the first router, or write key information generated by the terminal into the first NFC sensing device of the first router; and in response to approaching a second NFC sensing device of the second router and entering an effective communication range of the second NFC sensing device, write key information read from the first NFC sensing device into the second NFC sensing device, or write key information generated by the terminal into the second NFC sensing device of the second router. The first router and the second router perform networking based on the key information.

FIG. 11 is a schematic diagram of interactions among a terminal, a first router, and a second router according to an embodiment. As shown in FIG. 11, the interaction flow among the terminal, the first router, and the second router mainly includes the steps 1 to 3. In an example, when the terminal or the first router generates the key information, the terminal may be enabled to approach the first router, and when the terminal enters the communication range of the first NFC sensing device, NFC interaction is performed between the first router and the terminal. For example, the first router writes the generated key information into the first NFC sensing device, and the terminal reads the key information written into the first NFC sensing device. For another example, the terminal writes the generated key information into the first sensing device, so that the first router obtains the key information. Through the NFC interaction between the terminal and the first router at 1, the first router and the terminal obtain the key information. Further, step 2 is performed, that is, the terminal may be enabled to approach the second router, and when the terminal enters the communication range of the second NFC sensing device, the terminal is controlled to write the key information into the second NFC sensing device, so that the second router obtains the key information. On this basis, the first router and the second router may obtain the key information for networking connection, and step 3 is performed. For example, the first router encrypts the networking information with the key information and broadcasts the encrypted networking information. When the encrypted networking information is received, the second router may try to decrypt the networking information with the obtained key information. In response to successful decryption, a networking request is sent to the first router. It may be understood that, the networking information sent by the first router is used to broadcast and search for other routers that need to perform networking connection. Therefore, the sent networking information includes, for example, a device identifier of the first router, or critical information for other routers to perform targeted propagation of the networking request, such as the mesh address of the first router.

In an example, the user may control the terminal to generate key information, read the key information written into the NFC sensing device, and/or write the key information into the NFC sensing device through designated application program(s) of the terminal. For example, the user may trigger a startup of the designated application program(s) of the terminal through touches, voices, or pressing physical hardware. Further, the user may control the terminal to generate the key information by inputting a specified numerical value or touching a trigger control for randomly generating key information. For another example, the user may touch an NFC interactive control to set the key information generated by the terminal as information that the terminal needs to perform a write operation with the NFC function, so that the terminal may write the key information into the NFC sensing device in response to approaching the router and entering the effective communication range of the NFC sensing device of the router. In addition, the implementation of the terminal reading the key information in the NFC sensing device is similar to the above-mentioned process of writing the key information, which is not described here.

Based on the same concept, an embodiment of the disclosure also provides an apparatus for networking applied to a terminal.

It may be understood that, in order to implement the above-mentioned functions, the apparatus for networking according to the embodiments of the disclosure includes corresponding hardware structures and/or software modules for executing each function. Combining with the units and algorithm steps of each example disclosed in the embodiments of the disclosure, the embodiments of the disclosure may be implemented in hardware or a combination of hardware and computer software. Whether a function is performed by hardware or computer software driving hardware depends on a specific application and design constraints of the technical solution. Those skilled in the art may use different methods to implement the described functions for each specific application, but such implementation should not be considered beyond the scope of the technical solutions in the embodiments of the disclosure.

Figures 12, 13:
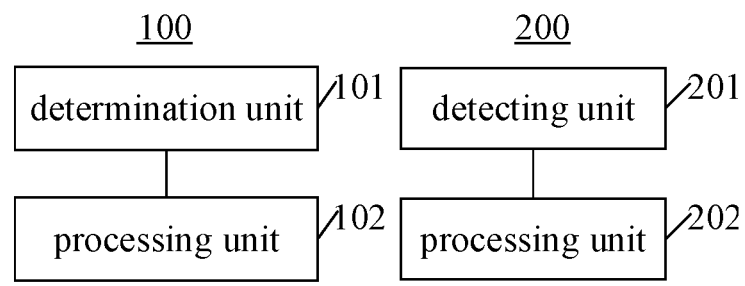
FIG. 12 is a block diagram of an apparatus for networking according to an embodiment.
FIG. 13 is a block diagram of another apparatus for a networking device according to an embodiment.

FIG. 12 is a block diagram of an apparatus for networking according to an embodiment. Referring to FIG. 12, the apparatus 100 includes a determination unit 101 and a processing unit 102.

The determination unit 101 is configured to determine whether the terminal approaches a first NFC sensing device of a first router and enters an effective communication range of the first NFC sensing device. The processing unit 102 is configured to in response to the terminal approaching the first NFC sensing device of the first router and entering the effective communication range of the first NFC sensing device, interact with the first NFC sensing device, so that the first router or the terminal obtains key information, in which the key information is configured for networking the first router and a second router; and in response to the terminal approaching a second NFC sensing device of the second router, and entering an effective communication range of the second NFC sensing device, write the key information into the second NFC sensing device.

In an embodiment, the processing unit 102 interacts with the first NFC sensing device so that the first router obtains key information by acts of: determining the key information generated by the terminal; and writing the key information generated by the terminal into the first NFC sensing device.

In an embodiment, the processing unit 102 interacts with the first NFC sensing device so that the terminal obtains key information by acts of: determining key information written into the first NFC sensing device; and reading the key information written into the first NFC sensing device.

Based on the same concept, the disclosure also provides an apparatus for networking applied to a router.

FIG. 13 is a block diagram of another apparatus for networking according to an embodiment. Referring to FIG. 13, the apparatus 200 includes a detecting unit 201 and a processing unit 202.

The detecting unit 201 is configured to perform communication detecting based on a NFC sensing device of the router. The processing unit 202 is configured to in response to detecting that a terminal approaches the NFC sensing device and enters an effective communication range of the NFC sensing device, interact with the terminal through the NFC sensing device, so that the router or the terminal obtains key information, in which the key information is configured for networking the router and other router.

In an embodiment, the processing unit 202 interacts with the terminal through the NFC sensing device in the following manner so that the terminal obtains key information by acts of: determining key information generated and written by the router into the NFC sensing device; and transmitting the key information written into the NFC sensing device to the terminal.

In an embodiment, the processing unit 202 interacts with the terminal through the NFC sensing device so that the router obtains key information by acts of: reading key information written by the terminal into the NFC sensing device.

In an embodiment, the processing unit 202 is further configured to: encrypt networking information based on the key information; broadcast the encrypted networking information; and in response to receiving a networking request sent by the other router, perform networking connection to the other router, wherein the networking request is triggered after the networking information is successfully decrypted by the other router based on the key information.

In an embodiment, the processing unit 202 is further configured to: in response to receiving the networking information encrypted based on the key information, decrypt the networking information based on the key information; and in response that the networking information is successfully decrypted, send a networking request. The key information for successful decryption of the networking information is obtained by the terminal performing interactions with the other router.

Regarding the apparatus in the above-mentioned embodiments, the specific manner in which each module performs operations has been described in detail in the embodiments of the method, and will not be described in detail here.

Figure 14:
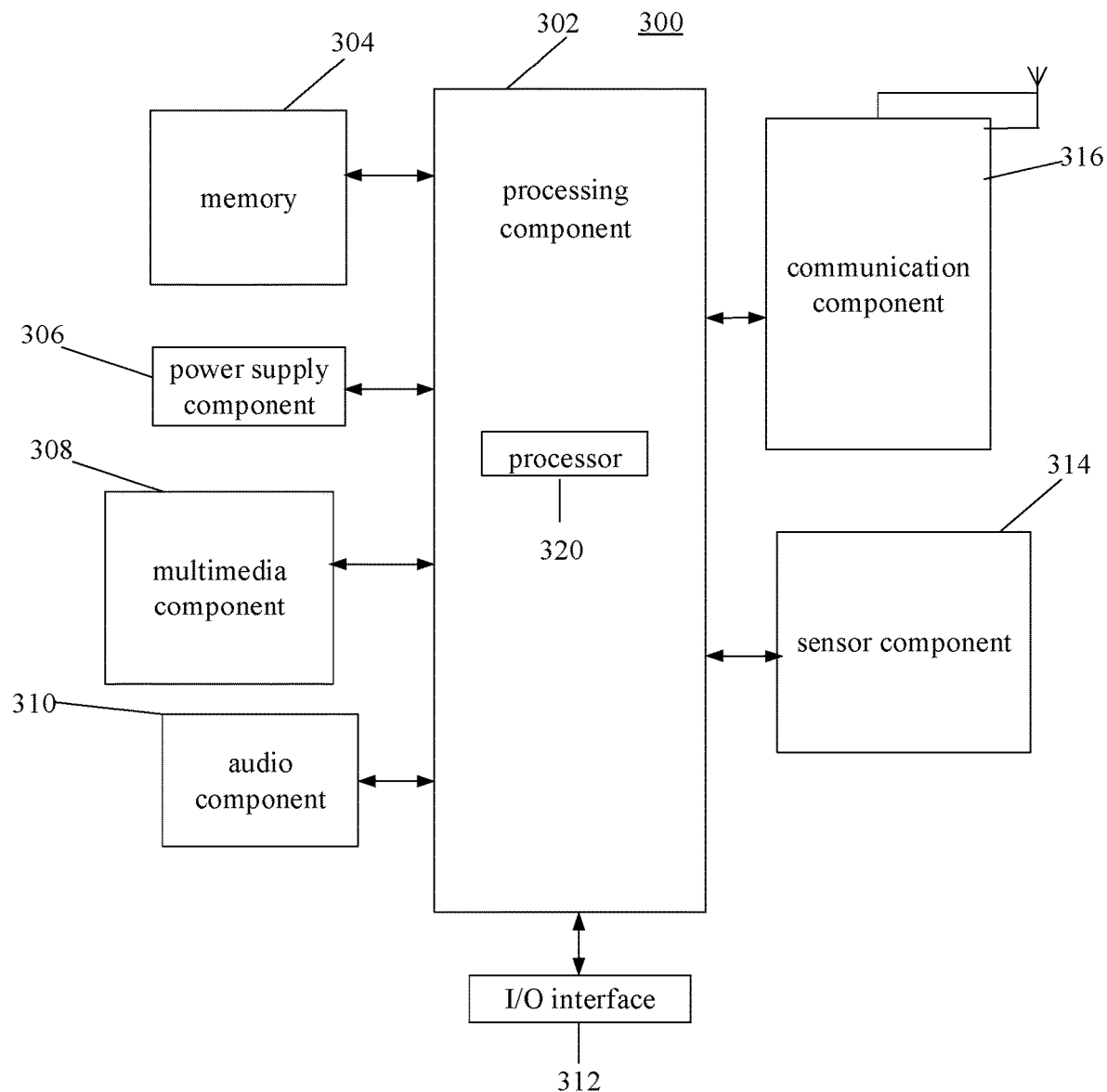
FIG. 14 is a block diagram of a device for networking according to an embodiment.

FIG. 14 is a block diagram illustrating a device 300 for networking according to an embodiment. For example, the device 300 may be a mobile phone, a computer, a digital broadcasting terminal, a messaging device, a game console, a tablet device, a medical equipment, a fitness equipment, a personal digital assistant, etc.

As illustrated in FIG. 14, the device 300 may include one or more components: a processing component 302, a memory 304, a power supply component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For example, the processing component 302 may include a multimedia module for the convenience of interaction between the multimedia component 308 and the processing component 302.

The memory 304 is configured to store all types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 306 may provide power for all components of the device 300. The power supply component 306 may include a power supply management system, one or more power supplies, and other units related to generating, managing and distributing power for the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. When the device 300 is in an operation mode, such as shooting mode or a video mode, the front camera and/or the rear camera may receive external multimedia data. Each of the front camera and the rear camera may be a fixed optical lens system or have focal length and optical zoom capability.

The audio component 310 is configured to output and/or input audio file information. For example, the audio component 310 includes a microphone (MIC) configured to receive external audio file information when the device 300 is in an operation mode, such as a call mode, a recording mode, and a voice recognition mode. The received audio file information may be further stored in the memory 304 or transmitted via the communication component 316. In some embodiments, the audio component 310 further includes a speaker for outputting audio signals.

The I/O interface 312 provides an interface for the processing component 302 and a peripheral interface module, and the peripheral interface module may be a keyboard, a click wheel, a button, etc. These buttons may include but are not limited to: a home button, a volume button, a start button and a lock button.

The sensor component 314 includes one or more sensors to provide status assessments of various aspects of the device 300. For example, the sensor component 314 may detect an on/off state of the device 300 and a relative positioning of a component. For example, the component is a display and a keypad of the device 300. The sensor component 314 may further detect the position change of the device 300 or a component of the device 300, a presence or absence of contact between a target object and the device 300, an orientation or acceleration/deceleration of the device 300, and the temperature change of the device 300. The sensor assembly 314 may include a proximity sensor configured to detect the presence of nearby objects without any physical contact. The sensor assembly 314 may also include a light sensor, such as a CMOS or CCD image sensor, for use in imaging applications. In some embodiments, the sensor assembly 314 may also include an acceleration sensor, a gyroscope sensor, a magnetic sensor, a pressure sensor, or a temperature sensor.

The communication component 316 is configured to facilitate communication, wired or wirelessly, between the device 300 and other devices. The device 300 may access wireless networks based on a communication standard, such as WiFi, 2G or 3G, 4G, 5G or their combination. In an embodiment, the communication component 316 receives broadcast information or broadcast associated information from an external broadcast management system via a broadcast channel. In an embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the device 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics elements, for performing the above method.

In an embodiment, a non-transitory computer readable storage medium including instructions is also provided, for example, a memory 304 including instructions. When the instructions are executed by the processor 320 of the device 300, the methods as described above may be carried out. The computer-readable storage medium may be a ROM, a RAM, a CD-ROM, a magnetic tape, a floppy disc, an optical data storage device, and the like.

It should be understood that in the disclosure, "plurality" refers to two or more than two, and other quantifiers are similar, "and/or" describes an association relationship of the associated objects, meaning that there may be three kinds of relationships, for example, A and/or B, which may mean that A exists alone, A and B exist at the same time, and B exists alone. The character "/" generally indicates that the related objects are an "or" relationship. The singular forms "a," "the," and "said" are intended to include the plural forms as well, unless the context clearly dictates otherwise.

It should be further understood that the terms "first", "second", etc. are used to describe various information, but the information should not be limited to these terms. These terms are used to distinguish the same type of information from one another, and do not imply a particular order or level of importance. In fact, the expressions "first", "second" etc. are used completely interchangeably. For example, the first information may also be referred to as the second information, and similarly, the second information may also be referred to as the first information, without departing from the scope of the disclosure.

It may be further understood that, unless otherwise specified, the term "connection" includes a direct connection between the two without other components, and also includes an indirect connection between the two with other elements.

It should be further understood that although the operations in the embodiments of the disclosure are described in a specific order in the drawings, it should not be construed as performing the operations in the specific order shown or the serial order, or performing all operations shown to obtain the desired result. In a specific situation, multitasking and parallel processing may be advantageous.

After considering the specification and practicing the disclosure herein, those skilled in the art will be aware of other embodiments of the present application. The disclosure includes the common knowledge or conventional technical means in the art not disclosed. The description and embodiments are considered exemplary, and the true scope of the disclosure are pointed out by the following claims.

It should be understood that the disclosure is not limited to the precise structure already described above and shown in the drawings. The scope of the disclosure is limited by the appended claims.

What is claimed is:

1. A method for networking, performed by a terminal, comprising:
   in response to the terminal entering an effective communication range of a first Near Field Communication (NFC) sensing device in a first router, interacting with the first NFC sensing device, so that the first router or the terminal obtains key information, wherein the key information is configured for networking the first router and a second router; and
   in response to the terminal entering an effective communication range of a second NFC sensing device in the second router, writing the key information into the second NFC sensing device;
   wherein the key information is configured for the first router to: encrypt networking information; broadcast the encrypted networking information; in response to receiving a networking request sent by the second router, determine whether key information included in the networking request passes verification; in response to determining the key information included in the networking request passes verification, perform networking connection to the second router, wherein the networking request is triggered in response that the networking information is successfully decrypted by the another router based on the key information.

2. The method of claim 1, wherein when the key information is generated by the terminal, interacting with the first NFC sensing device comprises:
   writing the key information generated by the terminal into the first NFC sensing device, so that the first router obtains the key information.

3. The method of claim 1, wherein when the key information is written by the first router into the first NFC sensing device, interacting with the first NFC sensing device comprises:
   reading the key information written into the first NFC sensing device.

4. The method of claim 1, wherein the key information is generated by numerical values through a random algorithm.

5. The method of claim 1, wherein the first NFC sensing device and the second NFC sensing device are NFC tags.

6. A method for networking, performed by a router, comprising:
   performing communication detecting by a NFC sensing device in the router; and
   in response to detecting that a terminal enters an effective communication range of the NFC sensing device, interacting with the terminal via the NFC sensing device, so that the router or the terminal obtains key information, wherein the key information is configured for networking the router and another router;
   wherein the method further comprises:
   encrypting networking information based on the key information;
   broadcasting the encrypted networking information;
   in response to receiving a networking request sent by the another router, determining whether key information included in the networking request passes verification; and
   in response to determining the key information included in the networking request passes verification, performing networking connection to the another router, wherein the networking request is triggered in response that the networking information is successfully decrypted by the another router based on the key information.

7. The method of claim 6, wherein when the key information is written by the router into the NFC sensing device, interacting with the terminal via the NFC sensing device comprises:
   transmitting the key information written into the NFC sensing device to the terminal.

8. The method of claim 6, wherein when the key information is generated by the terminal, interacting with the terminal via the NFC sensing device comprises:
   reading the key information written by the terminal into the NFC sensing device.

9. The method of claim 8, further comprising:
   in response to receiving networking information encrypted based on key information, decrypting the networking information based on the key information, wherein the key information is obtained by the terminal performing interactions with the another router, and
   in response to successful decryption of the networking information, sending a networking request.

10. The method of claim 6, wherein broadcasting the encrypted networking information comprises:
    setting the encrypted networking information in a management frame, and broadcasting the management frame.

11. A system for networking, comprising:
    a first router with a first NFC sensing device, wherein the first NFC sensing device is configured to sense whether a terminal enters a first effective communication range of the first NFC sensing device;
    a second router with a second NFC sensing device, wherein the second NFC sensing device is configured to sense whether the terminal enters a second effective communication range of the second NFC sensing device;
    the terminal, configured to in response to entering the first effective communication range, interact with the first NFC sensing device, so that the first router or the terminal obtains key information; and in response to entering the second effective communication range, writing the key information into the second NFC sensing device;

wherein the first router and the second router are networked by using the key information;

wherein the first router is configured to:

encrypt networking information based on the key information;

broadcast the encrypted networking information;

in response to receiving a networking request sent by the second router, determine whether key information included in the networking request passes verification; and in response to determining the key information included in the networking request passes verification, perform networking connection to the second router, wherein the networking request is triggered in response that the networking information is successfully decrypted by the second router based on the key information.

12. The system of claim 11, wherein when the key information is generated by the terminal, the terminal is further configured to write the key information generated by the terminal into the first NFC sensing device, so that the first router obtains the key information.

13. The system of claim 11, wherein when the key information is written by the first router into the first NFC sensing device, the terminal is further configured to read the key information written into the first NFC sensing device.

14. The system of claim 11, wherein the first router is further configured to:

set the encrypted networking information in a management frame, and broadcast the management frame.

15. The system of claim 11, wherein the second router is configured to:

receive the encrypted networking information, decrypt the networking information based on key information, wherein the key information is obtained by the terminal performing interactions with the first router, and in response to successful decryption of the networking information, send a networking request to the first router.

16. The system of claim 11, wherein the key information is generated by numerical values through a random algorithm.

17. The system of claim 11, wherein the first NFC sensing device and second NFC sensing device are NFC tags.

* * * * *